Nov. 17, 1931.   L. W. THOMPSON   1,832,822
REGULATING SYSTEM
Filed Nov. 21, 1928

Inventor:
Louis W. Thompson,
by Charles E. Tullar
His Attorney.

Patented Nov. 17, 1931

1,832,822

UNITED STATES PATENT OFFICE

LOUIS W. THOMPSON, OF SCHENECTADY, NEW YORK, ASSIGNOR TO GENERAL ELECTRIC COMPANY, A CORPORATION OF NEW YORK

REGULATING SYSTEM

Application filed November 21, 1928. Serial No. 320,913.

My invention relates to regulating systems and more particularly to regulating systems for controlling an electrical characteristic of an electric circuit or of a dynamo-electric machine.

In many regulating systems it is desirable to eliminate vibratory contacts and for this purpose a rheostatic type of regulator comprising a movable contact device operated in response to an electrical characteristic to be controlled and cooperating with a resistor to vary the amount of resistance in the circuit to be controlled has been used with varying degrees of success. Regulators of this type, however, have been sluggish in action compared with regulators of the vibrating contact type and are generally unsuitable for use in systems of regulation where a sensitive and quick acting regulator is necessary.

It is an object of my invention to provide an improved type of rheostatic regulator which is simple and rugged in construction, reliable in operation and which approaches the vibrating contact type of regulator in sensitiveness to small or large variations in the electrical characteristic to be regulated.

Another object of my invention is to provide an improved type of rheostatic regulator in which differential means comprising either a mechanical or an electrical differential arrangement is employed to effect the regulation.

A further object of my invention is to provide a new and improved type of regulating resistor in a regulating system of the rheostatic type.

Figure 1:
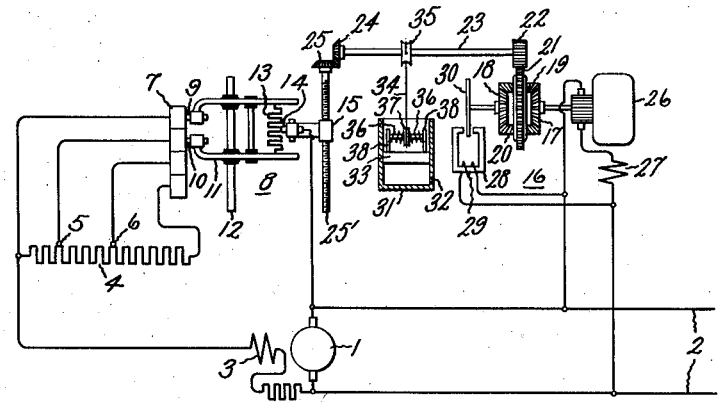
Figure 2:
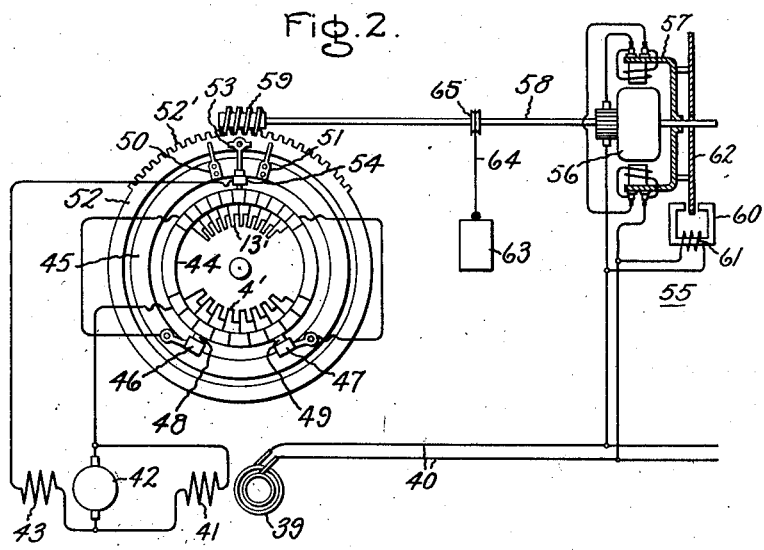

The novel features which I believe to be characteristic of my invention are set forth with particularity in the appended claims, the invention itself, however, both as to organization and method of operation together with further objects and advantages thereof, will best be understood by reference to the following description taken in connection with the accompanying drawings in which Fig. 1 is a diagrammatic illustration of a regulator and system of regulation embodying my invention and showing means for effecting the regulation through the intermediary of a mechanical differential, and Fig. 2 is a modification of the arrangement shown in Fig. 1 showing diagrammatically means for adjusting a commutator type of regulating resistor through the intermediary of an electrical differential.

Referring to Fig. 1 of the drawings, 1 indicates a dynamo-electric machine which is to be controlled. As shown, the dynamo-electric machine 1 represents a direct current generator which is connected to supply electrical energy to a distribution circuit 2. The generator 1 is provided with a field winding 3 which is connected to be energized from the armature of the generator and has connected in series therewith a regulating resistor 4 for effecting relatively large increments of change in the energization of field winding 3. The regulating resistor 4 is of relatively high value and is provided with a plurality of taps, designated as 5 and 6 for purposes of illustration, in order to divide the resistor into a plurality of sections of unequal resistance values. The resistance value of the respective sections is so designed as to provide sections having voltage drops thereacross of substantially equal value throughout the range of energization of the field winding 3. The terminals of resistor 4 as well as the intermediate taps 5 and 6 are connected to different insulated segments of a commutator device 7. A movable contact device 8 is arranged in cooperative relation with the commutator 7 and comprises two brushes 9 and 10 which are supported in a yoke member 11 and arranged to make contact with two adjacent segments of the commutator. The yoke member 11 is mounted on a supporting member 12 and is adapted to be moved thereon when engaged by a movable member to be described presently.

A resistor 13 of relatively low value for effecting changes in the energization of field winding 3 in relatively small increments is connected to the brushes 9 and 10 through the arms of the yoke member 11 and is thereby adapted to be connected in parallel with the sections of resistor 4. A contact element or brush 14 is arranged in slidable contact with resistor 13 and is connected to one terminal of generator 1 thereby completing the excitation circuit of the generator through the resistors 4 and 13. The brush 14 is mounted in a brush holder 15.

The means for adjusting the value of the resistors 4 and 13 comprises a differential coupling 16 which for purposes of illustration in this embodiment is shown as comprising mechanical differential gearing including two bevel gears 17 and 18 and two differential gears 19 and 20 interposed between the bevel gears 17 and 18. The differential gears 19 and 20 are suitably mounted in a frame having a gear 21 thereon so as to have both a rotary motion about their own axes and a rotary motion about the axes of the bevel gears. The intermediate gears 19 and 20 and the gear 21 constitute the planetary member of the differential coupling. The gear 21 meshes with a gear 22 which is mechanically connected to rotate the shaft 23 which in turn is connected through suitable gears 24 and 25 to rotate a screw-threaded shaft 25' which is mechanically connected to gear 25. The screw-threaded shaft 25' engages with a suitable cooperating tapped portion on brush holder 15 in order that rotation of shaft 25' in one direction will move the brush holder 15 and thereby brush 14 in one direction and rotation of shaft 25' in the opposite direction will cause movement of brush 14 in the opposite direction.

Electrodynamic means such for example as a dynamo-electric machine is arranged for causing rotation of bevel gear 17 at a speed varying in accordance with an electrical characteristic of generator 1 or of the distribution circuit 2 and as shown comprises an electric motor 26 provided with a series connected field winding 27 and connected to be responsive to the voltage of circuit 2. The rotation of gear 17 causes rotation of gear 18 in the opposite direction thereto through the intermediary of the differential gears 19 and 20. Electromagnetic means are provided for retarding the motion of gear 18 and as shown comprises a brake of the magnetic drag type comprising a core 28 around which a coil 29 is wound and between the poles of which is located an armature 30 of conducting material which is connected to rotate with gear 18. The coil 29 should be connected to be responsive to the same electrical characteristic to which the electrodynamic means is made responsive and as shown is connected to be responsive to the voltage of circuit 2.

The interaction between the motor 26 and the magnetic braking means produces a torque tending to cause the planetary member of the differential gearing to rotate about the axis of the bevel gears. This torque is opposed by a counter-torque which may be obtained in any suitable manner by weights, springs, etc. Preferably this means comprises an arrangement which permits prompt response of the planetary member to a tendency to rotate followed up by an appropriate damping action. In the illustrated embodiment of this arrangement I have shown a dashpot which comprises a cylindrical casing 31 provided with a suitable vent 32 and having a piston 33 in the form of a weight which is adapted to move up and down in the cylinder. A suitable means such as a cord or flexible chain 34 is secured to shaft 23 through the intermediary of the pulley 35 which is secured thereto and adapted to receive cord 34 upon rotation of shaft 23. The cord 34 is preferably resiliently connected to the weight 33 by any suitable spring connection which as shown comprises two roller springs 36 each secured at one end to a small rotatable pulley 37 to which cord 34 is secured and at the other end to supports 38 which in turn are secured to the piston-weight 33 in any suitable manner. The mass and damping of the weight 33 is suitably chosen so that at a predetermined normal value of the characteristic which is to be regulated the torque tending to rotate the planetary member 21 will be substantially balanced so that the planetary member will be maintained stationary and consequently the resistance varying means will be in a similar state.

The operation of the illustrated embodiment of my invention is as follows: Assume that generator 1 is being operated by any suitable motive power or prime mover and that the voltage of the distribution circuit 2 is at the predetermined normal value. Under these assumptions motor 26 will be energized and will rotate gear 17 at a speed of rotation depending upon the value of the predetermined normal voltage and the design characteristics of the motor which is preferably arranged to have a speed of rotation proportional to the voltage applied across its terminals. The rotation of gear 17 also rotates gear 18 in the opposite direction thereto through the intermediary of the differential gears 19 and 20 which in turn rotate about their own axes without any tendency of rotation about the axes of the gears 17 and 18 in the absence of the application of any other force. However, when motor 26 is energized the coil 29 of the magnetic retarding means is energized and the rotation of the conducting disc 30 between the poles of the core 28 retards the rotation of gear 18 and produces a torque because of the difference in speeds of the bevel gears 17 and 18 tending to rotate the planetary member of the differential about the axes of the bevel gears. In accordance with my invention however this torque is balanced at the predetermined voltage by means including the weight 33 acting on the shaft 23 which tends to rotate through the action of the planetary gear 21 and the gear 22. Under these conditions there is no appreciable change in the amount of resistors 4 and 13 included in circuit with field winding 3.

It will now be assumed that the voltage of circuit 2 rises above the predetermined value. As a consequence the speed of motor 26 will increase and at the same time the energization of the coil 29 of the brake magnet will increase resulting in an increased retarding force and thereby a decrease in the speed of gear 18. This change in the relative speeds of gears 17 and 18 results in an increased torque which is no longer balanced and causes movement of the planetary member 21, which for purposes of explanation will be assumed to be in a clockwise direction as viewed in the drawing from the motor end of the differential coupling. Rotation of the planetary member in a clockwise direction results in a direction of rotation of the screw-threaded shaft 25' which moves brush holder 15 and consequently brush 14 downwardly as viewed in the drawings to increase thereby the amount of resistor 13 included in circuit with the field winding 3. The increase of resistance in the field winding circuit tends to return the voltage of generator 1 to the predetermined normal value. However, if the increase in voltage exceeds a value coming within the range of control by the auxiliary resistor 13, brush holder 15 will continue in its downward direction and engage the yoke member 11 and move this member in a similar direction to include the next adjacent commutator segments so as to place auxiliary resistor 13 in parallel with the section of resistor 4 between taps 5 and 6. This places in series with field winding 3 the portion of resistor 4 between the outer terminal and tap 5 in series with the parallel connection of the portion between taps 5 and 6 and the auxiliary resistor 13. Under the usual operating conditions this change would probably be sufficient to return the voltage of generator 1 to the predetermined normal value and brush 14 can then freely reciprocate between the limits established by the yoke member 11 to control the regulation for small variations of voltage under the new conditions. It will be readily understood however that it may be necessary for yoke 11 to be moved to the next succeeding adjacent commutator segments or it may remain in the position to which it was last moved for some time depending upon the magnitude of the change in voltage.

Now if it is assumed that the voltage of generator 1 decreases below the predetermined normal value, the speed of motor 26 will decrease in accordance with the magnitude of the change in voltage and consequently the speed of rotation of gear 17 will decrease. At the same time the energization of coil 29 will decrease and cause a decreased retardation of gear 18 which will increase its speed of rotation. Under these conditions the torque tending to rotate the planetary gear 21 in a clockwise direction as previously assumed will be less than the opposing torque due to the weight 33 and the weight will move the planetary gear in a counter-clockwise direction. Consequently the screw-threaded shaft 25' is rotated in the opposite direction from that previously described and the brush holder 15 is moved in an upwardly direction as viewed in the drawings. If the change in voltage is small the brush 14 will play over the resistor 13 between the limits established by the yoke 11, but if the change is of greater magnitude than comes within the range of regulation by means of resistor 13 the yoke 11 will be moved in a direction to cut out the portion of the main resistor between taps 5 and 6 and place resistor 14 in parallel with the outside terminal and terminal 5 of the main resistor.

In Fig. 2 of the drawings I have shown an embodiment of my invention utilizing an electrical differential coupling instead of the mechanical differential gearing and which by way of example is also shown in connection with a regulating system for an alternating current generator instead of a direct current generator. It will be readily understood, however, that either type of differential coupling is equally well adapted for the regulation of either a direct current dynamo-electric machine or an alternating current dynamo-electric machine. The alternating current generator 39 is shown very diagrammatically as a single phase machine and is connected to energize a distribution circuit 40. The generator 39 is provided with a suitable field winding 41 which is connected to be energized by suitable excitation means represented as a direct current exciter 42. The exciter 42 is provided with a field winding 43 connected across the exciter terminals and having in circuit therewith the regulating resistors 4' and 13' similar in design to the resistors 4 and 13 of the arrangement shown in Fig. 1, but in this modification I have shown diagrammatically a different mechanical arrangement for the commutator type of regulator. The resistors 4' and 13' are each made up of a plurality of interconnected sections, the sections of the resistor 13' being each of materially lower resistance value than the resistance of the corresponding sections of the resistor 4'. The various sections of the resistor portion 13' are preferably of substantially equal value and the sections of the resistor 4' are of unequal values so as to provide sections having voltage drops there across of substantially equal value throughout the range of energization of the field winding 43. The terminals of the various resistor sections are connected to segments of a stationary commutator 44 and as viewed in the drawings resistor sections 13' and 4' are connected to the upper and lower half respectively. With this arrangement the resistor portions 4' and 13' may be located at any convenient place and the commutator with the various other portions of the regulating means may be located at another convenient place, as for example, adjacent the machine to be controlled.

Any suitable means may be provided whereby a slidable contact may be secured between the exciter armature terminal, field winding terminal and the various connections and interconnections between the commutator segments associated with resistors 4' and 13' respectively. In accordance with the illustrated embodiment a rotatable member is mounted for rotation about the axis of the commutator 44 and comprises a ring 45 concentric therewith. Two brush holders 46 and 47 are secured to the ring 45 and carry brushes 48 and 49 which are connected to the end sections of resistor 13' in order to place the latter resistor in parallel with the sections of resistors 4' which are spanned by the brushes 48 and 49. One end of the resistor 4' is connected to the armature terminal of the exciter 42. Two stops 50 and 51 are secured to the ring 45 on the portion opposite the brush holders 46 and 47. A second rotatable member 52 mounted to rotate about the axis of the commutator 44 is arranged concentrically with the ring 45 and carries a brush holder 53 and a brush 54. The brush 54 is arranged in slidable engagement with the commutator segments associated with the resistor 13' and is connected to a terminal of the exciter field winding 43. The brush holder 53 is arranged to move between the limits established by the stops 50 and 51. The ring 52 is geared over a suitable portion 52' to furnish means whereby the brush 54 may be reciprocated back and forth over the portion of the commutator 44 associated with resistor 13' upon movement of the ring 52. The effective member of the sections of resistor 4' is varied by means of the brushes 46 and 47 which are arranged to remain in the position to which they were last operated. The arrangement is such that the brush 54 is able to reciprocate back and forth over the commutator 44 independently of the brushes 48 and 49, as long as the brush 54 is within the limits determined by the stops 50 and 51, but as soon as the brush 54 is moved by the ring 52 in excess of this independent movement, either the stop 50 or 51, as the case may be, is engaged by the brush holder 53 in which the brush 54 is mounted, and the brushes 48 and 49 are thereby shifted either in a clockwise or counter-clockwise direction, as the case may be, to a new position. This shifting of the brushes 48 and 49 also establishes a new path of independent movement for the brush 54 so that as long as the brush 54 reciprocates over segments of the commutator 44 associated with resistor 13'. between the new position of the stops 50 and 51, movement of the brushes 48 and 49 will not be affected.

The rotatable member 52 is operated in accordance with variations in the electrical characteristic which is to be controlled and in accordance with the illustrated embodiment is arranged to be operated in accordance with variations in the voltage of the distribution circuit 40. In this instance regulation is obtained by an electrical differential coupling 55 which comprises a dynamo-electric machine including a rotatable armature 56 and a rotatable field structure 57. The field structure 57 is mounted to rotate on the shaft 58 of the armature 56. The dynamo-electric machine is preferably of the series type and is connected to be responsive to the voltage of the distribution circuit 40. The armature shaft 58 is connected to operate a worm gear 59 which is positioned to engage the geared portion 52' of the rotatable member 52. Electromagnetic means are provided for retarding the motion of the rotatable field structure 57 and as shown comprises a brake of the magnetic drag type comprising a core 60 around which a coil 61 is wound and between the poles of which is located an armature 62 of conducting material connected to rotate with the field structure 57. The coil 61 is connected to be responsive to the same electrical characteristic to which the dynamo-electric machine is made responsive and as shown is connected to be responsive to the voltage of the distribution circuit 40.

For a given voltage the interaction between the field and armature of the dynamo-electric machine tends to cause a certain relative speed of rotation between armature and field. In this particular instance the rotation of the armature is opposed and the field structure is permitted to rotate. With the magnetic braking means the relative speed of rotation between field and armature is not obtained and a torque is produced whereby the armature tends to rotate in a direction and at a speed to restore the normal inherent relative speed of rotation between the field and armature. At the predetermined normal voltage of the distribution circuit 40 this torque tending to cause rotation of the armature 56 is opposed by a counter-torque which may be obtained in the same manner as described in connection with Fig. 1 but which in this embodiment is shown, for purposes of simplicity of illustration, as a weight 63 secured to the shaft 58 by means of a cord or flexible chain 64 through the intermediary of a pulley 65 adapted to receive the cord 64 upon the rotation of shaft 58.

The operation of the illustrated embodiment of my invention is as follows: Assume that generator 39 is being operated by any suitable motive power or power mover and that the voltage of the distribution circuit 40 is at the predetermined normal value. Under these assumptions the field structure 57 will rotate at a speed of rotation depending upon the value of the predetermined normal voltage and the design characteristics of the motor, which is preferably arranged to have a speed of rotation proportional to the voltage applied across its terminals. The rotation of the armature is opposed by the weight 63 which also is arranged to balance the torque tending to cause rotation of the armature in a direction to maintain the normal inherent relative speed of rotation when the field structure is retarded in its motion by the energization of the magnetic retarding means 60.

It will now be assumed that the voltage of circuit 40 rises above the predetermined value. As a consequence the speed of rotation of field structure 57 tends to increase but since the retardation is increased the field structure does not rotate at a speed corresponding to the increase in voltage. As a consequence the armature rotates in a direction and at a speed to maintain the normal inherent relative speed between armature and field because the opposing torque no longer balances the tendency of the armature to rotate. The direction of rotation of the armature is arranged so that the rotatable member 52 is moved in a direction to increase the resistance in circuit with the field winding 43 of the exciter 42. In the illustrated embodiment this direction of rotation is such as to move ring 52 in a counter-clockwise direction so that brush 54 changes the number of sections of resistor 13' to increase the resistance. If this change is not sufficient brush holder 53 will finally engage stop 50 and increase the number of sections of resistor 4' included in circuit with the field winding 43. The increase of resistance in the exciter field winding decreases the generator excitation so that the generator voltage tends to return to normal. However, if the increase in voltage exceeds a value coming within the range of control by the resistor 13' ring 52 will continue its counter-clockwise movement and include more of resistor 4' in the exciter field circuit. It will be readily understood that the extent of the movement of ring 52 will depend upon the magnitude of the change in voltage.

Now if it it assumed that the voltage of generator 39 decreases below the predetermined normal value, the speed of rotation of the field structure 57 will tend to decrease due to the decrease in voltage. At the same time the energization of the magnetic drag magnet decreases so that the resulting torque tending to rotate the armature is no longer sufficient to balance the torque resulting from the weight 63 and the armature is rotated in the opposite direction from that previously assumed so that the ring 52 is rotated in a clockwise direction to decrease the resistance included in the field circuit of exciter 42. Rotation of ring 52 in the clockwise direction, as viewed in the drawings, causes a decrease in the resistance within the range of the resistor 13', and is followed by a change of greater degree, if necessary, by the engagement of brush holder 53 with stop 51 in a manner similarly described in connection with the previous disclosure for regulation of voltage above the predetermined normal value.

While I have shown and described a particular embodiment of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States, is:

1. In a regulator, means comprising a plurality of relatively rotatable elements, means for causing relative rotation between said elements, means operative in accordance with variations of speed of said elements and a second variable condition of said regulator for continuously acting to effect differential movement between said elements, and means for opposing said differential movement.

2. In a regulator, means comprising a plurality of relatively rotatable elements, electrodynamic means for causing relative rotation between said elements, electro-magnetic means operative in accordance with variations of the speed of one of said elements and a second variable condition of said regulator to furnish a torque for effecting a differential movement between said elements, and means for balancing said torque at a predetermined value of the condition to be regulated.

3. In a regulator, means comprising a plurality of relatively rotatable elements, a dynamo-electric machine for causing relative rotation between said elements, electro-magnetic retarding means operative in accordance with variations of the speed of one of said elements and an electrical condition of said electro-magnetic means for exerting a torque on one of said elements tending to change the relative speed of rotation between said elements, and means for balancing said torque at a predetermined value of the condition to be regulated.

4. In a regulator, differential means including two rotatable members and a planetary member, dynamo-electric means connected to one of said rotatable members for causing rotation of both of said rotatable members, electromagnetic means operative in accordance with variations of speed of the other of said members and the condition to be regulated for continuously retarding the other of said rotatable members to effect movement of said planetary member about the axis of said rotatable members, and means for opposing the said movement of said planetary member.

5. In a regulator, differential means including two rotatable members and a planetary member, dynamo-electric means connected to one of said rotatable members for causing rotation of both of said rotatable members, electromagnetic means operative in accordance with speed variations of the other of said rotatable members and an electrical characteristic of said dynamo-electric means for retarding the other of said rotatable members to effect movement of said planetary member about the axis of said rotatable members, and means comprising a weight retarded in its movement and resiliently connected to said planetary member for opposing said movement thereof.

6. In a regulating system, an electric circuit, means including a movable contact element for varying an electrical characteristic of said circuit, means including a plurality of relatively movable members for controlling said contact element, means responsive to an electrical characteristic of said circuit for causing rotation of one of said movable members, means responsive to an electrical characteristic of said circuit for continuously applying a torque tending to cause a change in the relative speed of rotation of said movable members, and means for opposing said torque.

7. In a regulating system, an electric circuit, a variable impedance having a movable contact element for controlling an electrical characteristic of said circuit, differential means including two rotatable members and a planetary member operatively associated with said contact element, dynamo-electric means responsive to an electrical characteristic of said circuit for rotating said rotatable members, means responsive to an electrical characteristic of said circuit for continuously opposing rotation of one of said rotatable members to produce a torque tending to move said planetary member, and means for balancing the torque tending to cause rotation of said planetary member at a predetermined value of said electrical characteristic.

8. In a regulating system, an electric circuit, a variable resistor having a movable contact element for controlling the voltage of said circuit, differential means including two rotatable members and a planetary member connected to move said contact element, a motor connected to one of said rotatable members and arranged to vary its speed in response to variations in the voltage of said circuit for rotating said rotatable members in opposite directions through the intermediary of said planetary member, magnetic means connected to be energized in accordance with the voltage of said circuit for continuously opposing the rotation of the other of said rotatable members to produce a torque tending to move said planetary member about the axis of said movable members, and means for balancing the torque tending to cause said movement of said planetary member at a predetermined value of the voltage of said circuit.

9. In a regulating system, an electric circuit, a resistance for controlling an electrical characteristic of said circuit, means for varying said resistance, means including two rotatable members for effecting movement of said resistance varying means, and electromagnetic retarding means and electrodynamic means energized from said electric circuit and operatively associated with said rotatable members for effecting inverse changes in the speeds of rotation of said rotatable members when said electrical characteristic departs from a predetermined value.

10. In a regulating system, an electric circuit, a resistance for controlling an electrical characteristic of said circuit, means for varying said resistance, a differential coupling including two rotatable members and a planetary member connected to operate said resistance varying means, a dynamo-electric machine connected to be responsive to an electrical characteristic of said circuit and connected to rotate one of said rotatable members at a speed proportional to the value of said electrical characteristic, electromagnetic retarding means connected to be responsive to said electrical characteristic of said electric circuit for retarding one of said members in degree proportional to the speed of said one of said rotatable members.

11. In a regulating system, an electric circuit, a resistance for controlling the voltage of said circuit, means for varying said resistance, a differential coupling including two rotatable members and a planetary member connected to operate said resistance varying means, a motor connected to one of said rotatable members and arranged to vary its speed in accordance with variations in the voltage of said circuit for rotating said rotatable members in opposite directions through the intermediary of said planetary member, magnetic means connected to be energized in accordance with the voltage of said circuit for retarding the other of said members in degree proportional to the speed of said one of said members.

12. In a regulating system, an electric circuit, a resistance for controlling the voltage of said circuit, means for varying said resistance, a differential coupling including two rotatable members and a planetary member connected to operate said resistance varying means, a motor connected to one of said rotatable members and arranged to vary its speed in accordance with variations in the voltage of said circuit for rotating said rotatable members in opposite directions through the intermediary of said planetary member, magnetic means connected to be energized in accordance with the voltage of said circuit for continuously opposing the rotation of the other of said members to produce a torque tending to move said planetary member about the axis of said movable members, and means comprising a weight damped in its movement and resiliently connected to said planetary member to oppose said torque tending to cause said movement of said planetary member.

13. In combination, a dynamo-electric machine, a field winding therefor, rheostatic means for controlling the energization of said field winding including a main resistance divided into a plurality of sections of unequal resistance value for producing voltage drops of substantially equal value successively across said sections under different conditions of energization of said field winding, and an auxiliary resistor arranged to be connected in parallel across each section and varied in accordance with changes in an electrical characteristic of said dynamo-electric machine of a predetermined extent and arranged to be moved successively in parallel with different sections of said main resistor when the regulating range of said auxiliary resistor is exceeded.

14. In combination, a dynamo-electric machine, a regulator therefor having two cooperating movable elements for controlling a variable condition of said machine, a resistor of relatively high value divided into a plurality of sections of unequal resistance value varied by the first of said movable elements, a second resistor of relatively low value arranged to be connected in parallel with the sections of said first resistor and varied by the second of said movable elements, the second of said elements being arranged to reciprocate freely between limits as determined by the first of said elements to give a fine regulation effect by variation of said second resistor and to shift the first element to give a coarse regulation by variation of said first resistor upon movement of said second element beyond said limits, and means operated responsively to the said varying condition of said machine and connected to said second element for operating the same.

15. In combination, an electric generator having a field winding, a resistance regulator for said field winding, the said regulator having two cooperating movable elements for controlling the voltage of said generator by varying the energization of said field winding, one of said elements being arranged to reciprocate freely between limits as determined by the second of said elements independently of the second element and to shift the second element upon movement of said first element beyond said limits, the said second element being arranged to remain in position to which it is last operated by said first element, a resistor of relatively low value varied by said first element, a second resistor of relatively high value divided into sections of unequal resistance value in parallel relation with said first resistor and in series with said field winding, and varied by said second element, and a differential coupling actuated by means connected to be responsive to the voltage of said generator for controlling said first movable element.

16. In combination, an electric generator having a field winding, a resistance regulator for said field winding, the said regulator having two cooperating movable elements for controlling the voltage of said generator by varying the energization of said field winding, one of said elements being arranged to reciprocate freely between limits as determined by the second of said elements independently of the second element and to shift the second element upon movement of said first element beyond said limits, the second element being arranged to remain in position to which it is last operated by said first element, a resistor for effecting small increments of change in the energization of said field winding and varied by said first element, a second resistor in series with said field winding for effecting increments of change of substantially greater degree than is effected by said first resistor in parallel relation with said first resistor and varied by said second element, a differential coupling including two rotatable members for operating said first movable element, and an electric motor and magnetic retarding means each energized from said electric circuit for actuating said rotatable members to effect inverse changes in the speeds of rotation thereof when said electrical characteristic departs from a predetermined value.

17. In combination, an electric generator having a field winding, a resistance regulator for said field winding, the said regulator having two cooperating movable elements for controlling the voltage of said generator by varying the energization of said field winding, one of said elements being arranged to reciprocate freely between limits as determined by the second of said elements independently of the second element and to shift the second element upon movement of said first element beyond said limits, the second element being arranged to remain in position to which it is last operated by said first element, a resistor for effecting small increments of change in the energization of said field winding and varied by said first element, a second resistor in series with said field winding for effecting increments of change of substantially greater degree than is effected by said first resistor in parallel relation with said first resistor and varied by said second element, a differential coupling including two rotatable members and a planetary member connected to operate said first movable element, a motor connected to one of said rotatable members for effecting a speed of rotation thereof in accordance with the voltage of said generator, magnetic retarding means energized in accordance with the voltage of said generator for continuously opposing the rotation of the other of said members to produce a torque tending to move said planetary member about the axis of said movable members, and means comprising a weight damped in its movement and resiliently connected to said planetary member to balance the torque tending to cause said movement of said planetary member at a predetermined value of the voltage of said generator.

In witness whereof, I have hereunto set my hand this 20th day of November, 1928.

LOUIS W. THOMPSON.